United States Patent [19]

Schroeder

[11] Patent Number: 5,127,601
[45] Date of Patent: Jul. 7, 1992

[54] CONFORMAL LIGHTNING SHIELD AND METHOD OF MAKING

[75] Inventor: John E. Schroeder, Huntington Beach, Calif.

[73] Assignee: Lightning Diversion Systems, Huntington Beach, Calif.

[21] Appl. No.: 635,391

[22] Filed: Jan. 2, 1991

Related U.S. Application Data

[63] Continuation of Ser. No. 299,137, Jan. 23, 1989, abandoned.

[51] Int. Cl.$^5$ .......................... B64D 45/02; H05F 1/02
[52] U.S. Cl. ..................................... 244/1 A; 361/218
[58] Field of Search ............... 244/121, 123, 133, 1 A; 361/216, 217, 218, 117

[56] References Cited

U.S. PATENT DOCUMENTS

| | | | |
|---|---|---|---|
| 3,896,342 | 7/1975 | Puget | 361/117 |
| 3,989,984 | 11/1976 | Amason et al. | 244/1 A |
| 4,352,142 | 9/1982 | Olson | 361/218 |
| 4,502,092 | 2/1985 | Bannink et al. | 244/1 A |
| 4,522,889 | 6/1985 | Ebneth et al. | 361/218 |
| 4,574,325 | 3/1986 | Holton | 244/1 A |
| 4,583,702 | 4/1986 | Baldwin | 244/1 A |
| 4,628,402 | 12/1986 | Covey | 361/218 |
| 4,755,904 | 7/1988 | Brick | 361/117 |

OTHER PUBLICATIONS

"Astro Strike Screening" product advertisement by Astroseal Products Manufacturing Corp., Old Saybrook, Conn., May 1988 (2 pages).
"TD-715", cover letter and product data sheet by Brunswick Technetics, DeLand, Florida, Sep. 24, 1987 (2 pages).
"Lightning Protection of Aircraft, A Short Course", Lightning Technologies, Inc., Mar. 1985, document cover sheet and pp. 4.15–4.22.
"Aircraft Jolts from Lightning Bolts", IEEE Spectrum, Jul. 1988, pp. 34–38.

Primary Examiner—Galen Barefoot
Attorney, Agent, or Firm—Knobbe, Martens, Olson & Bear

[57] ABSTRACT

A device for shielding composite material surfaces of aircraft from the destructive forces associated with lightning strikes and for protecting avionics from electromagnetic interference (EMI) and radio frequency interference (RFI), is provided, consisting of a thin metallic foil having uniformly spaced polygonal apertures formed therein. The polygonal apertures are so shaped as to provide at least one axis along which the shield material can expand or lengthen, permitting the shield material to better fit the irregular or compound curved surfaces found on aircraft. The foil shield can also be used to protect the filler material used between joints and to repair breaks and openings formed in the aircraft surface. When fashioned out of aluminum and applied to a composite material, such as graphite epoxy, the shield may be plated with nickel to prevent galvanic corrosion caused by the contact between dissimilar materials. When manufactured from copper the shield provides a solderable surface. A method for manufacturing such a shield is also provided where photolithographic techniques are used to mask, expose, and etch apertures into metallic sheets.

22 Claims, 3 Drawing Sheets

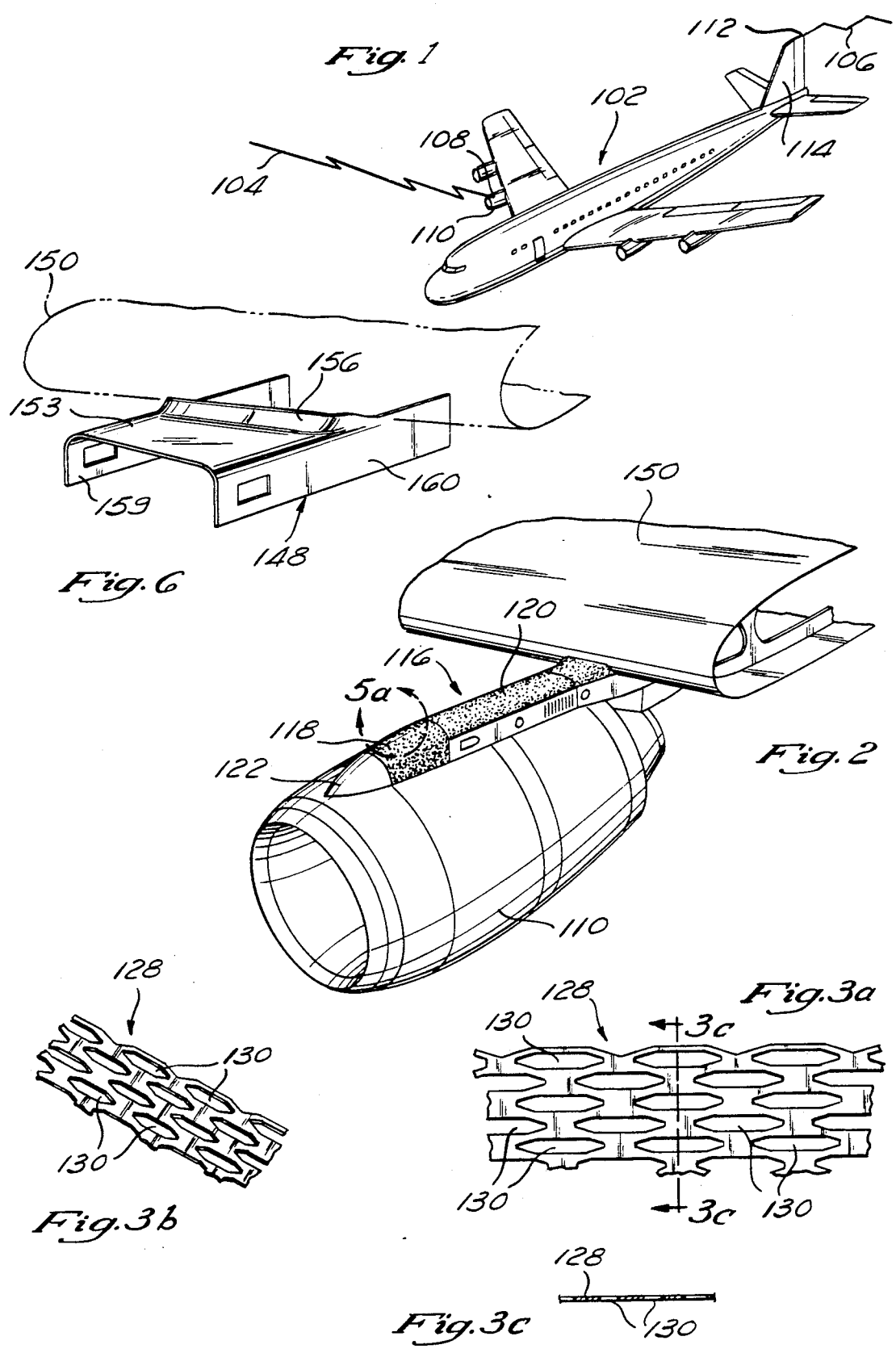

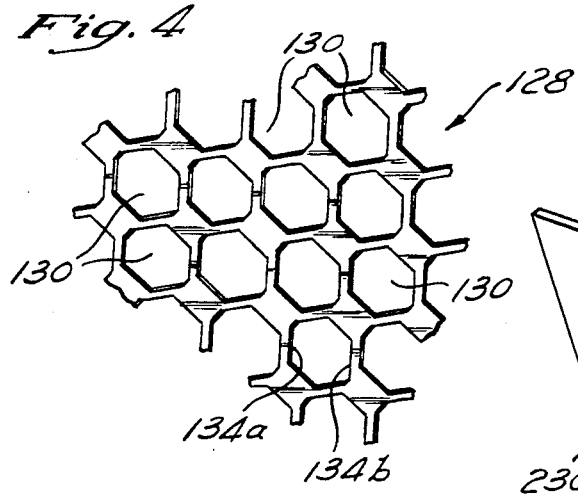
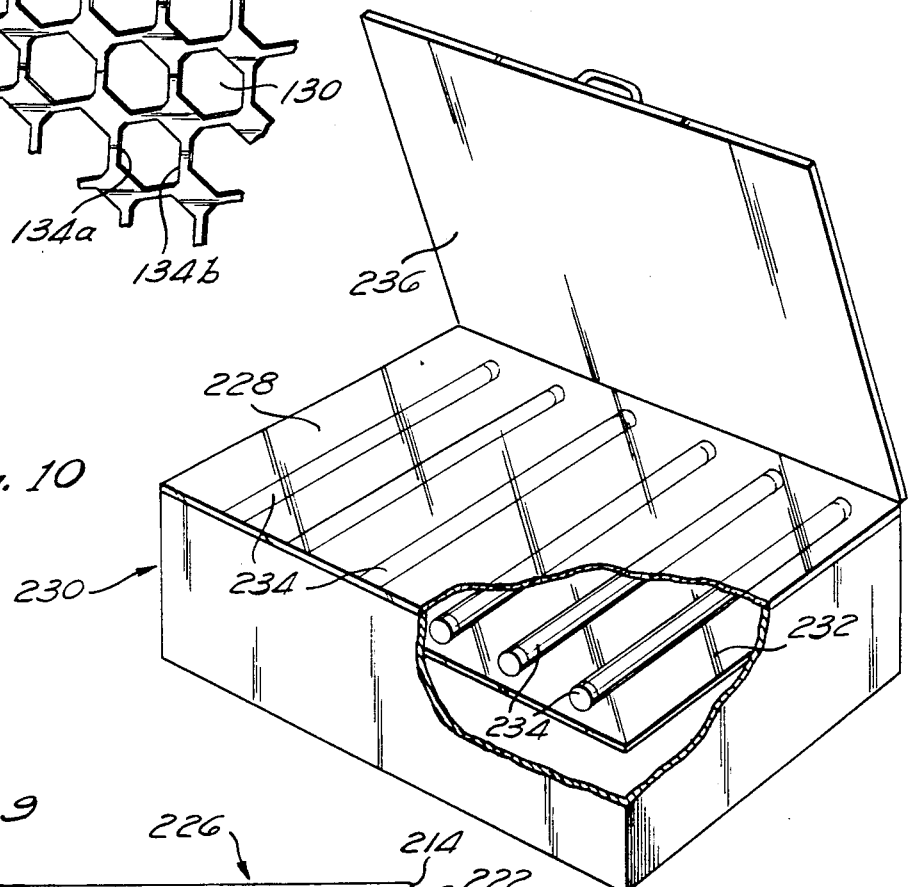
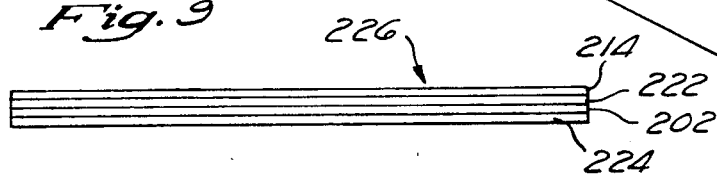
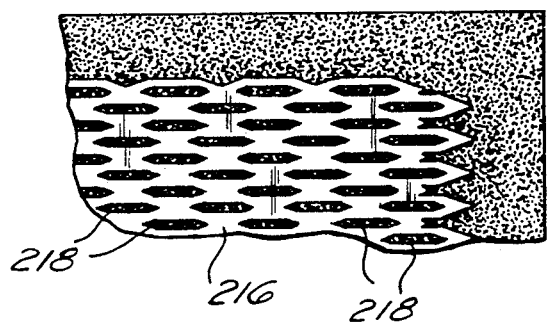

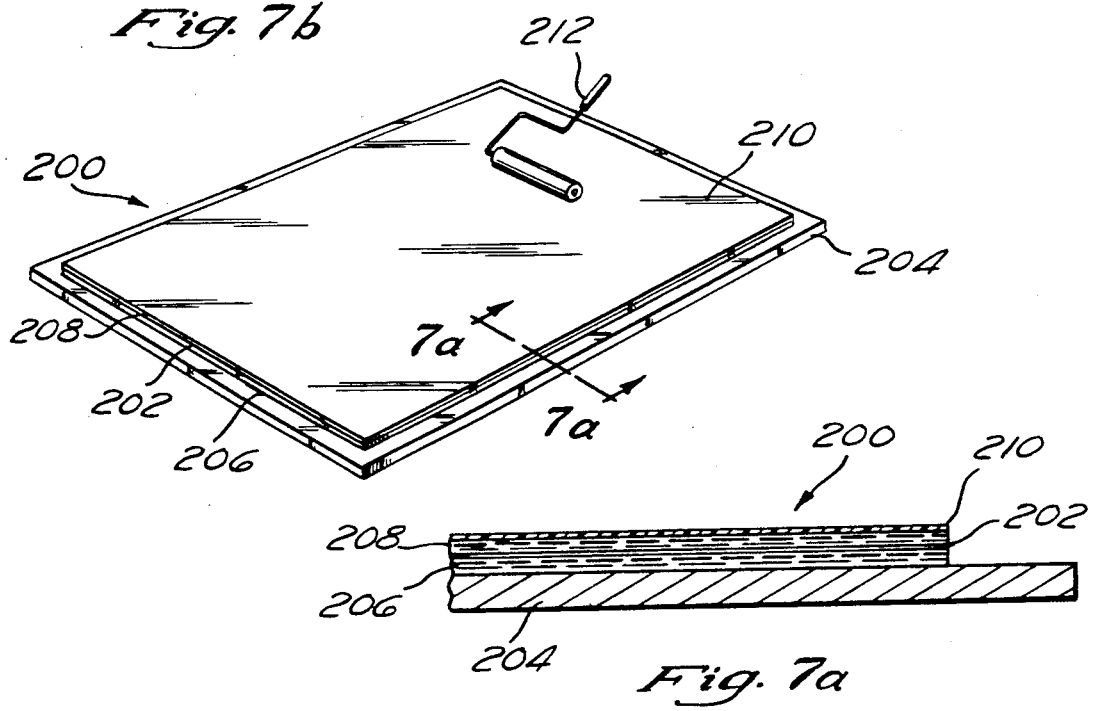
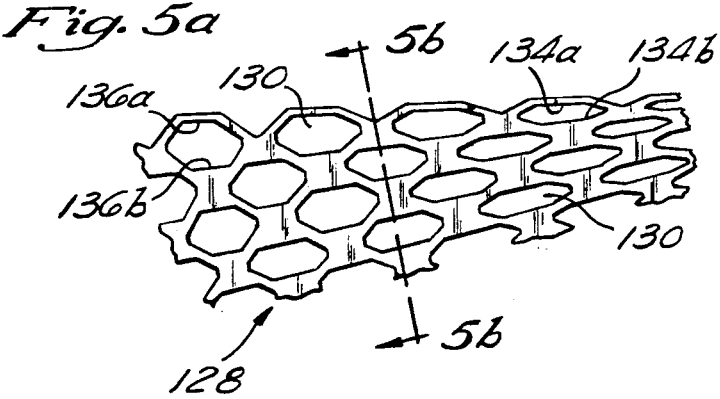
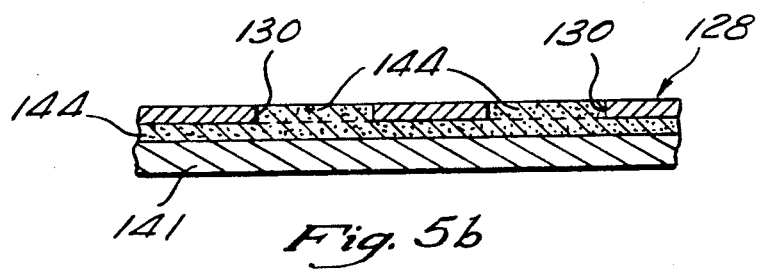

CONFORMAL LIGHTNING SHIELD AND METHOD OF MAKING

This application is a continuation of application Ser. No. 07/299,137, filed Jan. 23, 1989, now abandoned.

BACKGROUND OF THE INVENTION

1. Field of the Invention

The present invention generally relates to lightning protection systems for aircraft and, more particularly, is concerned with lightning shields that can be conformed and bonded to the various compound geometric surfaces found on composite material aircraft.

2. Description of the Prior Art

Composite materials, such as carbon fiber/resin products, are increasingly being used in the aircraft industry to take advantage of their relatively high strength/weight ratio. It can be expected that increasing marketplace pressures for larger payloads and greater fuel economy will continue to encourage the use of composites. However, and not unexpectedly, these non-metallic materials also present several design problems that are new to the industry, among which is a vulnerability to lightning damage. The previous all metal skin provided an excellent conductive surface, which is now replaced, in whole or in part, with a resistive material. Composite aircraft exterior surfaces, or skins, perform poorly when exposed to lightning. Thus, composite surfaces must be shielded against the harmful effects of lightning strikes.

Lightning is a violent, discontinuous discharge of electrical current in the air, most often found inside or around cumulonimbus (thunderstorm) clouds. An aircraft flying in the vicinity of thunderstorms is susceptible to "participating" in the path of a lightning discharge. Recent experimental results ("Aircraft Jolts From Lightning Bolts", IEEE Spectrum, July, 1988, pp. 34-38) indicate, however, that aircraft actually initiate lightning more often than they intercept it. In the majority of aircraft strikes, as the airplane flies into a strong electric field, leaders of opposite charge form at the extremities of the aircraft such as at the nose, tail, and/or wing tips.

Air is a very poor conductor of electricity, and these leaders mark the nascent stage of a lightning strike, as the surrounding air begins to electrically "break down," forming the more conductive ionization channels. The leaders continue to develop bi-directionally and three-dimensionally around the airplane. This process continues at a rate determined by such factors as the ambient electric field strength and the particular characteristics of the electrical "circuit" including the capacitances and conductivities of the aircraft and the leader channels. Given a sufficiently strong field, a lightning discharge will occur down a specific leader pathway or channel of ionized air. This lightning channel may persist for more than a second after the airplane surface has become a "part" of the channel, with this conductive pathway remaining relatively stationary while the airplane continues its forward motion. Such relative movement causes the forward attachment point to "sweep back" over the airplane's surface, (the so-called "swept-stroke" phenomenon), resulting in an increased potential vulnerability for additional aircraft surfaces besides the leading edges and other curved surfaces that have a greater initial electric potential. New lightning attachment points can occur at any location on the aircraft surface, and adequate lightning protection requires a continuous protective shielding for composite materials over the entire aircraft surface.

Metallic aircraft encountering lightning will conduct the electric current of a strike across the skin of the aircraft, in most cases suffering little resultant damage. On the other hand, composite materials like graphite epoxy resins, are resistive conductors that inhibit current conductance. By way of comparison, a graphite composite will absorb nearly 2,000 times the energy absorbed by the same mass of aluminum. It has been shown that the intense current density of a lightning strike, frequently approaching 200,000 amperes in one second, with rates of current change observed to 380,000 amperes per microsecond, can vaporize or "puncture" the thin composite laminates that make up the skin of the aircraft. Once such penetration occurs further damage can be done as the lightning pathway "intrudes" on the avionics, power supply circuitry or other critical systems, and actual physical damage may result as this current surge runs amok inside of the aircraft. Electromagnetic energy may also enter the aircraft through other types of apertures. In addition to holes created suddenly by lightning attachment to nonconducting aircraft skins, other apertures include seams where skin panels meet and repaired locations on skin sections that have been previously damaged. Because present techniques for seam filling and body hole patching utilize a nonconductive body putty, an electromagnetic "aperture" remains after such body putty is applied. Other electromagnetic apertures include exposed conductors, such as antennas.

Electromagnetic fields that enter the aircraft can wreak havoc with on board avionics. This problem is further aggravated by the increasing use of digital designs in modern avionics to control critical flight functions besides their traditional navigation and communication tasks. It is well known that digital circuits, as compared to analog circuits, have little tolerance for electrical disturbances. A chief goal of modern aircraft designers must be to ensure that electromagnetic fields are not permitted to breach the aircraft skin, where they may disrupt avionics, damage structural components, and perhaps injure passengers or crew.

In response to these design requirements, a number of different shielding structures have been proposed for use with the new composite materials. These solutions generally require embedding a metallic substance into the composite skin. After the composite surface has been so shielded, conductivity is improved and the high density lightning currents are harmlessly dissipated over the surface of the aircraft. Three principal techniques have been shown to reduce the hazards associated with lightning, and each has met with varying degrees of success, with each presenting its own unique drawback to the aircraft designer.

In the first technique, composite fibers and aluminum or copper wires are interwoven into a fabric-like mesh. These shielding meshes perform well but they add a great deal of excess weight to the aircraft, typically around 0.08 lb./sq.ft. (see Table 1). To place this in the context of a typical commercial airliner, such as a Boeing 767, having a surface area of approximately 15,000 sq. ft., this interwoven mesh will add 1,200 lbs. to the aircraft weight. The additional load resulting from using this type of shielding forces the aircraft designer to incorporate more powerful engines into his design.

The larger engines carrying more weight will naturally burn more fuel.

A second technique is to employ a flame spray of metal, usually aluminum, which is applied to the exterior surfaces of the aircraft. Application thickness may vary between four and six mils. Although halving the weight of the first technique, the lack of uniformity in thickness of this technique may create thin spots on the aircraft skin that are prone to damage.

Aluminized fiberglass, the third technique, is a fabric composed of fiberglass yarns, the outside of which is coated with aluminum metal. The fabric is then bonded to the composite skin of an aircraft with adhesives. The interposition of fiberglass between the aluminum and the graphite epoxy prevents galvanic corrosion that would normally otherwise occur upon the joining of these two dissimilar materials. Nearly as heavy as the flame sprayed metallic coating, the thickness of the fabric poses a major drawback. This material is inflexible and is therefore difficult to apply to compound geometries such as fairings, struts, radomes, wing edges and like complex aerodynamic contours.

Consequently, a need exists for improvements in aircraft lightning shields that will be lighter in weight, of uniform thickness, and that will provide sufficient flexibility, such that the material can be easily applied to and around the compound geometries and apertures commonly found on the exterior surfaces of aircraft.

SUMMARY OF THE INVENTION

The present invention provides a conformal lightning shield device, and method for its production, designed to satisfy the aforementioned needs. The shield is one order of magnitude lighter in weight, 0.007 lb./sq.ft. for one mil aluminum foil), than any of the previously described techniques and, in addition, the present shield may be made to easily conform to the most complex of geometric surfaces. Besides acting as an outer conductive shield for lightning strikes, this invention also provides an effective avionics shield against external electromagnetic interference (EMI) and radio frequency interference (RFI). Furthermore, the subject invention provides an added benefit when used in conjunction with an aircraft skin filler. Substituting for bulkier materials such as Delker screen, the shield can be applied between overlapping contoured sheets or it can be used in conjunction with composite panels to repair damaged surface sections.

The conformal lightning shield is a thin metallic foil, such as aluminum, which has uniformly spaced polygonal apertures cut throughout its body. The shield is manufactured by first applying photolithographic techniques to harden the foil in all places except where the apertures are cut, and then etching and stripping the foil in solvent baths. The foil can optionally be electroplated with a material like nickel, which intercedes between two galvanically dissimilar materials, such as aluminum and graphite epoxy. In use, the subject invention is adhesively bonded to composite material aircraft surfaces. When bonded to composite surfaces, the adhesive completely fills the shield apertures, leaving the aircraft surface extremely smooth.

The subject invention may also be fashioned from copper and applied to composite material antenna support structures. Since copper is a better conductor than aluminum it provides improved performance in the reception of electromagnetic frequencies. Copper also has a higher boiling point than aluminum. Thus, an antenna made from copper permits antenna leads to be soldered to it. Use of the copper foil embodiment about the antenna support both protects the support against lightning damage and enhances the antenna performance.

Various other objects, advantages, and features of the present invention will become readily apparent from the ensuing detailed description, and the novel features will be particularly pointed out in the appended claims.

BRIEF DESCRIPTION OF DRAWINGS

FIG. 1 is a perspective view of an aircraft being struck by lightning.

FIG. 2 is a perspective view of a turbine jet engine and fairing assembly.

FIG. 3a is a fragmentary plan view of an elongated hexagonal aperture embodiment of the present invention.

FIG. 3b is a perspective view of the embodiment shown in FIG. 3a.

FIG. 3c is a cross-sectional view of the embodiment shown in FIG. 3a, taken along line 3c—3c.

FIG. 4 is a perspective view of an elongated hexagonal aperture embodiment of the present invention after it has been stretched over a contoured surface.

FIG. 5a is a plan view of an elongated hexagonal aperture embodiment of the present invention showing the change in aperture size and shape associated with varying degrees of deformation as is required by the surface shown in FIG. 2.

FIG. 5b is a cross-sectional view of the embodiment shown in FIG. 5a, taken along line 5b-5b.

FIG. 6 is a perspective view of a strut to wing fairing with an aircraft wing shown in phantom.

FIG. 7a is a cross-section of FIG. 7b taken along line 7a—7a.

FIG. 7b is a perspective view of a sheet of the present invention having wrinkles removed with a roller.

FIG. 8 is a fragmentary plan view of the plastic photographic artwork mask used to image the elongated hexagonal aperture embodiment of the present invention.

FIG. 9 is a cross-sectional view of the plastic photographic artwork mask and dryfilm coated metallic foil as it is laid on the glass surface of a light box.

FIG. 10 is a perspective view with portions broken away showing a light box used to photolithographically apply the uniformly spaced aperture image to the dryfilm coating the surface of the present invention.

DESCRIPTION OF THE PREFERRED EMBODIMENT

Referring now to the drawings, and more particularly to FIG. 1, a jet powered aircraft 102 is shown while experiencing a lightning strike, (as conventionally depicted). The strike in fact, consists of an entry channel 104, shown forming an initial attachment point 108 on a turbine jet engine 110, and an exit channel 106, shown forming a trailing attachment point 112 on the tip of an empennage 114. Ideally, on aircraft having a continuous metallic surface or skin, the lightning current will be harmlessly dissipated at the points of attachment 108, 112 and conducted therebetween, across the surface of the aircraft. However, if the aircraft 102 is made out of a composite carbon/resin material, the current densities at the attachment points 108, 112 would far exceed the limits of the material, resulting in an explosive destruction and penetration of the aircraft skin (not shown). Thereafter, the precise path of the lightning current between the attachment points can not be predicted, and depends upon the lowest resistive path existing at that precise moment. More than likely, such a path would include power supply and avionics circuitry, causing disastrous results.

The aircraft 102 shown in FIG. 1 presents many contours that are difficult to wrap with metallic coverings. A typical "hard" surface to cover is a contour that exhibits a compound geometry. The present invention will not only cover simple geometric surfaces, but also these other "hard" contours. Examples of such compound geometries can be found in a turbine jet engine and fairing assembly 116 shown in FIG. 2. One exemplary compound geometry is an aft/forward fairing 118 which abuts an upper strut fairing 120. The aft/forward fairing 118 exhibits an approximate conic curvature about an axis tangent to the upper longitudinal surface of the turbine jet engine 110, with the radius of the cone narrowing towards the front of the engine, forming a fairing vertex 122. The surface of the aft/forward fairing 118, has a second degree of curvature, with a radius of curvature that extends perpendicularly from the surface of the aft/forward fairing 118 to the approximate center of the turbine jet engine 110. The geometry of the aft/forward fairing 118 thus consists of the conical and curvilinear geometries and is classified as compound.

In FIG. 3a, a conformal lightning shield 128 in accordance with the present invention is depicted in its sheet form state, prior to any deformation. Formed of a one mil thick (0.03 mm) of a metal foil, such as aluminum or copper, the lightning shield 128 is provided with a plurality of uniformly spaced, elongated apertures 130 formed therein. Although FIG. 3a depicts hexagonal apertures, the present invention is not to be viewed as being so limited. Other polygonal shapes may be selected, as may circles. However, at present, hexagonal apertures are a preferred shape. FIGS. 3b and 3c provide an illustration of the relative dimensions between the apertures 130 and the thickness of the metal foil used in forming the conformal shield 128.

FIG. 4 shows a fragment of the shield 128 that has been deformed to fit over a compound contour, such as the aft/forward fairing 118 shown in FIG. 2. The elongated hexagonal apertures 130 are most elastic if the material is stretched in the direction perpendicular to the axis of elongation for the hexagons. Thus, opposing polygon segments, a first set of perimeter segments 134a and a set of second perimeter segments 134b, stretch away from each other, forming an oblique angle when the shield 128 is made taught. This transformation or linear axis of expansion can best be understood by comparing the pre-deformed shape of the set of first and second perimeter segments 134a, 134b with a third and fourth set of perimeter segments 136a, 136b, which are also shown in FIG. 5a.

For compound geometries, i.e., those surface exhibiting multiple radii of curvature, the shield 128 should be aligned such that the line of greatest elasticity is made parallel to the direction of greatest curvature. For example, in FIG. 2, the greatest curvature of the compound geometry formed by the aft/forward fairing 118 is about the conic axis, extending back from the fairing vertex 122. It is now evident why circular and triangular shapes are less desirable shapes for the apertures 130. Both shapes are equally strong in all directions, making it more difficult to have the shield 128 conform to the shape of compound aircraft surfaces. It is believed that diamond-shaped apertures (not shown) may provide a suitable compromise between hexagons and these other, less elastic shapes, by providing a degree of flexibility in both perpendicular directions.

In FIG. 5a, the shield 128 exhibits further deformation at one end to show the various degrees of stretching required to "fit" a surface having a rapid degree of angular change, such as conic curvature found in the aft/forward fairing 118 (FIG. 2). FIG. 5a clearly shows how the pair of first and second hexagon perimeter segments 134a, 134b deform to allow conformal stretching of the shield 128. Upon deformation, the previously acute angles formed by the various segments open to become more oblique, with the degree of deformation induced in the shield closely matched to the topography of the particular aircraft surface being covered.

As is shown is FIG. 5(b), after being deformed to closely mate with the aircraft surface, the lightning shield 128 is bonded to the surface. Preferably, such bonding occurs using a compatible structural epoxy or adhesive, such as Magna Bond #6371, manufactured by Magnolia Plastics, Inc., of Chamblee, Ga. Upon application to a cured composite surface 141 having a lightning shield 128 conformed thereto, the bonding agent forms a bonding layer 144 that receives the lightning shield and fills the shield apertures 130. To assure an absolutely flat or matching surface between the shield 128 and the composite surface 141, it is preferred that the bonding layer 144 and the shield 128 be vacuum bagged. This process consists of placing the sandwiched structure to be bonded in a properly sealed vacuum bag enclosure. Then the air is evacuated to eliminate all entrapped air bubbles and create a pressure on the bag and sandwich structure, thus promoting complete material bonding.

A second example of a compound geometry, to which the shield 128 can be applied, is the strut-to-wing fairing 148, which mounts the turbine jet engine and fairing assembly 116 to a wing 150, (shown in phantom in FIG. 6). This assembly is designed to complete the aerodynamic attachment of the jet engine to the aircraft wing. A bridge pan 153 is provided with a curved back lip 156, forming a transition between the upper surface of the jet engine and the curved leading edge of the wing 150. The bridge pan 153 is also provided with a pair of lateral sides 159, 160, which curve downwardly to correspond to the downwardly curving jet engine circumference. At the lateral edges of the back lip, the lateral sides 159, 160 and the bridge pan 153 meet to form a compound geometry of these two curves.

To fabricate the preferred embodiment of the conformal lightning shield in accordance with the present invention, a materials assembly framework 200, (FIG. 7), is assembled to smooth the metal foil. First a sheet of metal foil 202 (FIG. 7a), such as aluminum foil having a thickness of 0.001 inches (0.03 mm) is cut into a sheet-form sized to fit the framing assembly 200, for example 24 in. by 26 in. (61 cm by 66 cm). The condition of the foil surface is of critical important for the photolithographic processes to follow; hands must be scrubbed and the working area made free of debris, dust, and grease. Wrinkles can be minimized by eliminating air currents from the working area. A thick base slab 204, such as 0.050 inch-thick aluminum sheet, slightly larger than the foil sheet, e.g., 25 inch×30 inch (63 cm by 76 cm), is then prepared and made free of nicks, scratches, and grease.

As a holding agent for the metal foil 202, a first layer of water 206 is sprayed on the most highly finished, i.e., smoothest side of the base slab 204. The metal foil 202 is then applied to the surface of the water coated base slab 204 and a second layer of water 208 is sprayed on top of the metal foil 202. On the top of this layering is placed a mylar sheet 210, preferably of 0.005 inch (0.13 mm) thickness.

As the next step, a soft rubber print roller 212 is used to further smooth the metal foil 202, now received by the materials assembly framework 200, as shown in Figure 7b. A sharp rubber squeegee (not shown), (e.g., grade 70 rubber), may then be drawn across the mylar sheet 210 until a mirror smooth surface is formed on the metal foil 202. The clear mylar sheet 210 is next removed and any excess water from the first and second layers of water 206, 208 is absorbed with paper towels (not shown). At this point, the surface may be sprayed with alcohol to speed up the drying process and to keep the surface clean.

The metal foil 202 is now ready to have a photosensitive dryfilm laminated on its surface. Prior to lamination, all static is eliminated by brushing the surface twice with a neutral brush. A Dynachem Model 300 laminator, for example, (not shown), using air pressure, may be used to laminate the metal foil 202. If this machine is used, the following operating parameters are recommended: 250 degrees Fahrenheit (121° C.) temperature, 30 PSI air pressure, 2–3, per minute speed, using G.S.I. or L.D. dryfilm type supplied by Dynachem. After the dryfilm has been laminated on a first side, the laminated surface should be placed in the framework assembly face down, and the original backside (side 2) should now be layered, smoothed, and then laminated, using the same procedures shown in FIGS. 7a and 7b, and as described above.

The dryfilm coated metal foil is now ready for photoprinting. In a conventional manner, a plastic photographic artwork mask 214, a corner fragment of which is shown in FIG. 8, having a transparent portion 216 and a plurality of opaque portions 218, is placed over the metal foil 202. The opaque portions 218 of the plastic mask 214 correspond to the apertures 124 in the lightning shield 128. The plastic mask 214 has more crisply defined vertices than do the somewhat ragged vertices of the finished lightning shield 128. The loss of definition in the finished lightning shield 128 is believed to primarily result from the undercutting of the masked metal foil during the etching process.

The interaction of these various layers is best shown with reference to FIG. 9. The dryfilm coating material is applied to the metal foil 202, forming a first coating layer 222 and a second coating layer 224. Prior to its first exposure, the plastic mask 214 is placed over the first coating layer 222, with the resultant construction comprising a masking assembly 226. The masking assembly 226 is laid on a glass surface 228 of a photo printing light box 230 (FIG. 10). The light box 230 is of a conventional design and has a mirrored bottom surface 232 to reflect the ultraviolet radiation generated by a plurality of tubular electric lamps 234 toward the glass top 228. A black rubber lid 236 is closed, the lamps turned on, and the pattern embodied in the plastic mask 214 is printed on the metal foil 202 by exposing the dryfilm coating to the ultraviolet electric lamps 234. The second layer dryfilm 224 is then exposed without a mask to harden and thus strengthen the metal foil surface. As mentioned, this is a conventional photoprinting process and the Millington Machine, Model VF-LB (FIG. 10) is one example of an appropriate photoprinting machine. A suitable set of operating parameters for this machine are as follows: 29–29.5 In. Hg. vacuum and a 2 minute exposure time.

The exposed aperture images are then photodeveloped. In the preferred method, the images are developed with 1,1,1 Trichloroethene for five minutes. This process is followed by placing the developed metal foil sheets 202 on a conveyer belt that runs through an enclosed chamber with spray nozzles to provide an even spray pattern of etching solution. Variations in material thickness, etch solution strength, and, to a lesser extent, ambient temperature, make is impossible to predict the precise amount of time required to obtain the proper degree of etching. Those skilled in this art select the time variable by first making a sample etching under the actual temperature and concentration conditions that are to be used, and then observing the etch rate over time obtained. For example, when etching 0.0028 inch copper foil using an ammonia based etchant such as Endura Etch, manufactured by Olin Hunt Specialty Products of Los Angeles, Calif., in a Chemcut Model 547 Etching System a conveyer speed control selection of position 3 at 125°–140° F. has proven to be appropriate in the past. For aluminum foil, a ferric choloride based etchant is preferred, and one skilled in the art will be able to perform a sample analysis to determine the proper etch rate, etch solution strength and temperature for a given foil thickness. After the metal sheets 202 have been etched, every aperture is inspected for defects. The exposed dryfilm is then stripped from the etched metal foil sheet 202 by dipping the metal sheet 202 in a commercial solvent, such as a methylene chloride solution. Care must be taken at this point as there is a tendency for the metal foil sheet to shrink in size and/or wrinkle during this step, and placing a weighted structure (i.e., glass plate or wire mesh) on top of the foil during the stripping process to provide a rigid envelope has been found to lessen this tendency. As a final step, the lightning shield 128 may be electroplated with a minimum 0.0001 inch plate of nickel in a conventional manner.

It is thought that the conformal lightning shield and method of manufacture and many of its attendant advantages will be understood from the foregoing description and it will be apparent that various changes may be made in the form, construction, and arrangement of the parts and steps thereof, without departing from the spirit and scope of the invention or sacrificing all of its material advantages, the form hereinbefore described being merely a preferred or exemplary embodiment thereof.

TABLE 1

| Protection System | Weight Penalties Weight with Adhesive (lb/ft$^2$) |
|---|---|
| Aluminum Wire Screen (200 × 200) | 0.08 |
| Aluminum Flame Spray (4–6.9 mil) | 0.04 |
| Aluminized Fiberglass | 0.05 |
| Conformal Lightning Shield (aluminum, 1 mil, Ni plate) | 0.007 |

What is claimed is:

1. A lightning shielded surface for composite aircraft, comprising:

an aircraft part having a cured composite outer surface;

a thin adhesive layer applied to said cured composite surface; and a thin metallic foil applied to said adhesive layer, said foil having a plurality of uniformly spaced polygonal apertures formed therein and of a selected shape such that said thin metallic foil substantially conforms to said cured composite surface, said adhesive layer being of such thickness that said polygonal apertures are filled with said adhesive layer, but the adhesive does not extend substantially above the surface of said foil and does not extend substantially onto the foil such that the foil and the adhesive in the foil apertures form a smooth surface.

2. The shield as defined in claim 1 wherein said shield is aluminum, said shield further including a plated layer of nickel to prevent galvanic corrosion between said aluminum shield and said composite surface of said aircraft.

3. The shield as defined in claim 1, wherein said polygonal apertures are elongated hexagons.

4. The shield as defined in claim 1, wherein said shield is manufactured from a solderable substance such as copper.

5. The shield as defined in claim 1, wherein said shield conforms to compound geometries.

6. The shield as defined in claim 1, wherein said shield is used over a filling material between overlapping structural joints and to repair damaged sections of said aircraft surfaces.

7. The shield as defined in claim 1, wherein said shield provides shielding for avionics from electromagnetic interference (EMI) and radio frequency interference (RFI).

8. A lightning shielded structure of an aircraft, comprising, an aircraft part made of cured composite material;

a thin metallic foil having a plurality of uniformly spaced polygonal apertures formed therein, wherein said metallic foil comprises a metal that is galvanically incompatible with said composite material, said foil in its free state being flexible and conformable to surfaces having a compound curvature;

a metallic plating on at least the inner surface of said metallic foil wherein said plating prevents corrosion of said metallic foil caused by galvanic incompatibility between said metallic foil and said composite material; and an intermediate adhesive layer that bonds said foil to the outer cured composite surface, while separating said foil from said surface, said layer filling the apertures in said foil while leaving the exterior of said foil substantially free of said layer.

9. The shield as defined in claim 8 wherein said foil is aluminum and said plated layer is nickel.

10. The shield as defined in claim 8, wherein said polygonal apertures are elongated hexagons.

11. The shield as defined in claim 8, wherein said shield conforms to compound geometries.

12. The shield as defined in claim 8, wherein said shield is used as a filling material between overlapping structural joints and to repair damaged sections of said aircraft surfaces.

13. The shield as defined in claim 8, wherein said shield provides shielding for avionics from electromagnetic interference (EMI) and radio frequency interference (RFI).

14. A conformable, conductive surface, comprising:

a part having a cured composite outer surface of compound geometry;

a sheetform conductive substrate having an array of interstices formed therein, said array arranged in a manner providing at least one linear axis of expansion, whereby the sheetform substrate can be selectively expanded along said linear axis to conform to said cured composite outer surface of compound geometry wherein said sheetform is affixed by a bonding agent to said cured composite outer surface such that the bonding agent forms a distinct bonding layer that receives the sheetform to fill the intristicies, while leaving the outer surface substantially free of said bonding agent; and an outer metallic layer covering at least the inner surface of said sheetform conductive substrate for protecting said sheetform from galvanic corrosion caused by the contact of said sheetform with a galvanically incompatible material.

15. A conformable, conductive surface as defined in claim 14, wherein said sheetform is aluminum.

16. A conformable, conductive surface as defined in claim 14, wherein said metallic covering is nickel.

17. A method for bonding a metallic conformable lightning shield having apertures to a composite aircraft surface, comprising the steps of:

covering said composite aircraft surface with an adhesive layer after said composite aircraft surface is cured;

applying said lightning shield layer over said adhesive to a sufficient thickness such that the adhesive fills said apertures without substantially covering said shield;

enclosing said layers with an enclosure; and evacuating air from said enclosure so that air bubbles entrapped in said layers are eliminated thereby promoting complete material bonding.

18. A method as defined in claim 17, wherein said adhesive layer covering comprises coating said aircraft surface with a liquid adhesive.

19. A method as defined in claim 17, wherein said adhesive layer covering comprises layering a film adhesive over said aircraft surface.

20. A method as defined in claim 17, additionally comprising the step of heating said layers so as to emulsify and harden said adhesive.

21. A method as defined in claim 17, wherein said enclosing and said evacuating are accomplished with a vacuum bag.

22. A lightning shielded combination comprising:

a cured composite aircraft part;

a thin metallic foil having a plurality of uniformly spaced polygonal apertures formed therein and of a selected shape such that said thin metallic foil before being secured to said part is flexible and conformed so as to substantially conform to a surface of said cured part; and an intermediate adhesive layer formed of material different from said composite aircraft part applied to said cured part surface for bonding said metallic foil to said part surface, said adhesive layer of sufficient thickness such that said polygonal apertures are fully received within said layer while the adhesive does not extend substantially beyond or onto the outer surface of said foil, thereby forming a smooth surface.

* * * * *